United States Patent
Kline, Jr.

(10) Patent No.: US 7,827,022 B2
(45) Date of Patent: Nov. 2, 2010

(54) SEQUENTIAL FUNCTION CHART VALIDATION TOOL

(75) Inventor: Robert C. Kline, Jr., Phoenix, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 968 days.

(21) Appl. No.: 11/535,696

(22) Filed: Sep. 27, 2006

(65) Prior Publication Data

US 2008/0126973 A1 May 29, 2008

(51) Int. Cl.
*G06F 9/45* (2006.01)

(52) U.S. Cl. .............................. 703/22; 700/86; 717/126

(58) Field of Classification Search ................... 703/22, 703/13; 715/772; 700/86; 717/120, 122, 717/136, 137, 126, 124
See application file for complete search history.

(56) References Cited

U.S. PATENT DOCUMENTS

| | | | |
|---|---|---|---|
| 5,436,855 A | | 7/1995 | Willafys et al. |
| 5,500,941 A | | 3/1996 | Gil |
| 5,644,487 A | * | 7/1997 | Duff et al. ...................... 700/56 |
| 6,256,598 B1 | * | 7/2001 | Park et al. ...................... 703/2 |
| 6,937,962 B2 | * | 8/2005 | Rousseau et al. ............. 702/183 |
| 2004/0153172 A1 | * | 8/2004 | Rousseau et al. ............. 700/26 |
| 2006/0167667 A1 | * | 7/2006 | Maturana et al. ............. 703/6 |
| 2006/0190851 A1 | | 8/2006 | Karaki et al. |

OTHER PUBLICATIONS

Peng et al., S. Ladder Diagram and Petri-Net-Based Discrete-Event Control Design Methods, IEEE Transaction on Systems, an, and Cybernetics—Part C: Application and Reviews, Nov. 2004, pp. 523-531.*
Engell et al., S. Hybrid Control Techniques for the Design of Industrial Controllers, Proceedings of the 44th IEEE Conference on Decision and Control and the European Control Conference, Dec. 2005, pp. 5612-5617.*
Le Parc et al., Grafcet Revisited with a Synchronous Data-Flow Language, IEEE TRansactions on Systems, Man, and Cybernetics, vol. 29, No. 3, 1999, pp. 284-293.*

* cited by examiner

*Primary Examiner*—Russell Frejd
(74) *Attorney, Agent, or Firm*—Turocy & Watson LLP; William R. Walbrun; John M. Miller

(57) ABSTRACT

Automated program validation components are provided to facilitate software program development for industrial control systems and processes. In one aspect, a simulation tool is provided for an industrial automation system. The simulation tool includes a transform component that receives one or more program chart components as input and outputs a subset of model components for simulation. A simulation component executes the subset of model components in order to validate the program chart components.

33 Claims, 22 Drawing Sheets

SEQUENTIAL FUNCTION CHART VALIDATION TOOL

TECHNICAL FIELD

The subject invention relates generally to industrial control systems and more particularly to a transformation component that breaks a program into basic components of a model, where the basic components are tested for validity by simulated execution of the model.

BACKGROUND

Programming languages for programmable logic controllers (PLC) can be provided in many different forms. In one case, IEC 1131-3 specifies an international standard for such programmable controller programming languages. As such, it specifies syntax, semantics and display for the following suite of PLC programming languages: Ladder diagram (LD); Sequential Function Charts (SFC); Function Block Diagram (FBD) Structured Text (ST); Instruction List (IL). One of the primary benefits of the 1131 standard is that it enables multiple languages to be used within the same programmable controller. This allows the program developer to select the respective language best suited to the particular task at hand.

From this suite of languages, Sequential Function Chart (SFC) programming offers a graphical method of organizing a program, where the three main components of an SFC are steps, actions and transitions. Steps are considered chunks of logic, i.e., a unit of programming logic that accomplishes a particular control task, and actions are the individual aspects of that task. Transitions are the mechanisms employed to move from one task to another. Generally, control logic for each Step, Action and Transition is programmed in one of the other languages specified by IEC 1131-3 such as Ladder Diagram or Structured Text.

As a graphical language, SFC programming offers several choices for executing a program. In a sequential configuration, the processor simply executes the actions in a step repeatedly, until the transition logic becomes true, where the processor then proceeds to the next step. In a selection branch, only one branch is executed depending on which transition is active. In a simultaneous branch, all branches are executed until the transition becomes active. In addition to various types of branches, the operation of individual actions within a step can be varied with the use of action qualifiers. Action qualifiers determine how the action is scanned and allows actions to be controlled without additional logic. For example, one could use a time-limited qualifier to limit the time that an ingredient valve is opened without writing specific logic to control such actions.

In practice, an active step in the SFC is highlighted to signal to the programmer which part of the program is executing—a useful feature for troubleshooting. This highlighting is an example of the 1131 standard's extensibility—the ability of a vendor to add a feature not specified in the standard. Although highlighting is a useful feature for troubleshooting, current SFC programming techniques provide many challenges. For example, chart structures allow programmers to design various loops that can converge and diverge in many different directions and according to many logical configurations. Such loops could be inadvertently configured as an infinite loop where upon execution of the chart, the infinite loop causes the controller to never reach the end of a program scan. In such cases, a watchdog timeout may occur where the controller would have to be subsequently reset via a power up and down sequence.

As can be appreciated, a plurality of logic errors could be installed by a given programmer during design of the SFC. Currently, existing systems would require live execution in the PLC to determine a given logic or sequence problem. This can take an inordinate amount of time to troubleshoot on the PLC where various steps or transitions may have to be sequentially disabled and re-enabled in order to determine potential programming errors. In many cases, all the components of the system may not be in place to properly execute a given SFC thus causing further debugging difficulties.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A software validation tool is provided for industrial control systems. Program components of a programmable logic controller (PLC) program such as a Sequential Function Chart (SFC) are automatically transformed into basic model components or elements. The basic model components are then executed by a simulator to determine whether or not underlying components of the program are validly constructed. In this manner, SFC programs can be automatically validated and corrected before being executed on the PLC which leads to more efficient installation/execution of the actual program and the associated PLC system. This is also advantageous since all the components of an operational PLC do not have to be in place in order to test the underlying SFC program. It is noted that other types of chart programs could also be modeled and simulated in a similar manner including Gant Charts, for example. Thus, the tool can be employed for validation of any SFC (or similar) programming logic, whether industrial controller based, PC based, or even simple instructions intended for manual human execution.

In general, components of the program are assembled from five basic types of model elements although other basic types can be employed if desired. The basic model element types include linear segments, AND divergences, AND Convergences, OR divergences, and OR convergences. After transforming the respective Industrial control program into the basic types, the program is then executed in an offline manner such as on a personal computer platform. During execution, program validity can be checked and verified. If errors are detected, the program designer can be notified where the error occurred and what actions may be necessary to correct such errors. When the model has been generated, structure of the model can be tested by analyzing a response to message events that are applied to the model. Such events include Activate, Deactivate, and Fire, for example, where model elements can respond by raising an error, sending deactivate messages to other model elements, sending activate messages to other model elements, or sending fire messages to other model elements.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent

DETAILED DESCRIPTION

Automated program validation components are provided to facilitate software program development for industrial control systems and processes. In one aspect, a simulation tool is provided for an industrial automation system. The simulation tool includes a transform component that receives one or more program chart components as input and then outputs a subset of model components for simulation. A simulation component executes the subset of model components in order to validate the program chart components. In this manner, program errors can be detected in a timely manner and corrected before deployment on the industrial control system. The simulation tool can be applied to Sequential Function Chart (SFC) development or to related program constructs such as a Gant Chart.

It is noted that as used in this application, terms such as "component," "interface," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
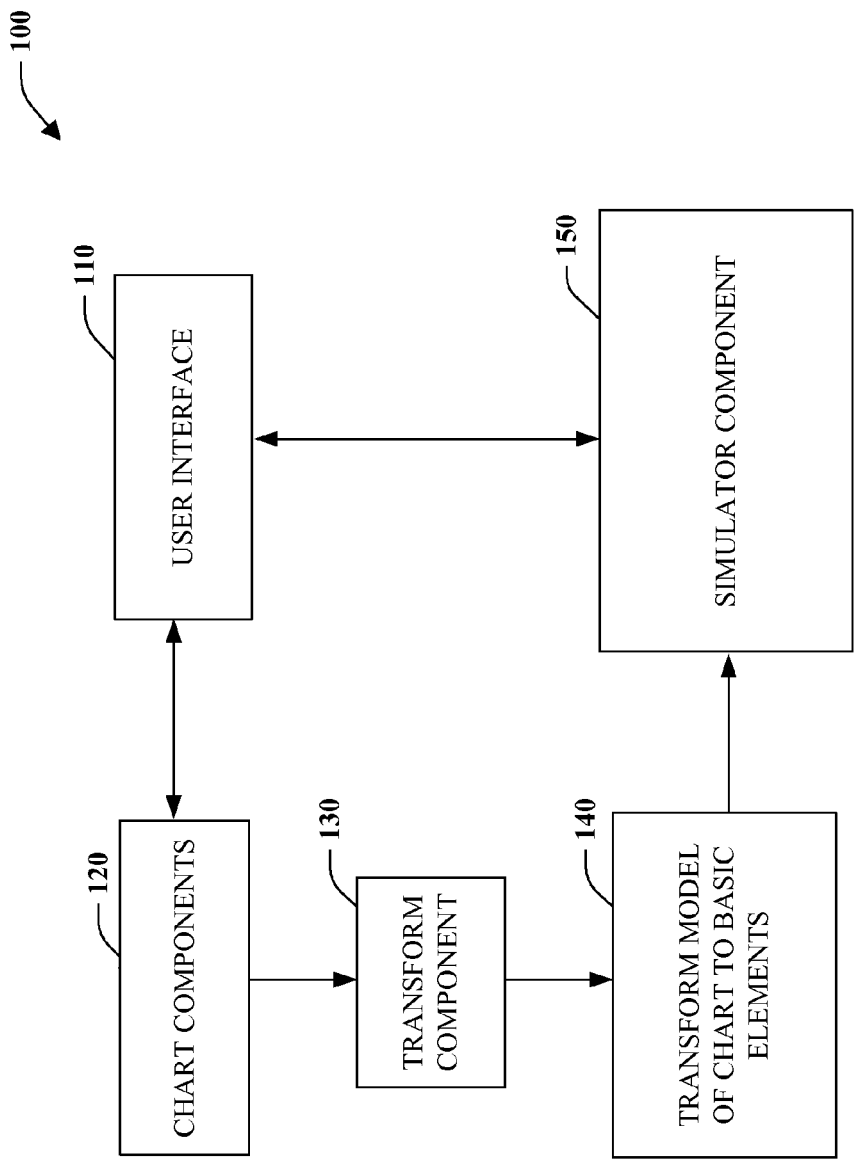
FIG. 1 is a schematic block diagram illustrating program simulation components for an industrial automation system.

Referring initially to FIG. 1, a system 100 illustrates program simulation for an industrial automation environment. The system 100 includes a user interface 110 that is employed to generate a programmable logic controller (PLC) program which is shown as one or more chart components at 120. In general, the chart components 120 are Sequential Function Chart (SFC) programming components but other chart styles such as a Gant Chart may be employed. The SFC provides a graphical method of organizing the Industrial control program via the user interface 110, where the chart components 120 of the SFC include steps, actions and transitions, for example. Steps are considered groupings of logic such as a component of programming logic that accomplishes a particular control task, where actions are the individual elements of the task. Transitions are program components employed to enable movement from one task to another and will be described in more detail below with respect to FIG. 3.

A software validation tool is provided for industrial control systems via a transform component 130, a transform model of basic elements 140, and a simulator component 150 that also interacts with the user interface 110. For instance, the user interface 110 can provide program validation confirmations, error indicators, and troubleshooting information based on responses generated by the simulator component 150. Program chart components 120 of a Industrial control program such as the SFC are automatically processed by the transform component 130 into basic model components or elements at 140. The basic model components 140 are then executed (or stimulated for a response) by the simulator component 150 to determine whether or not the underlying chart components 120 of the Industrial control program are validly constructed. In this manner, SFC programs (or other types) can be automatically validated and corrected before being executed on the PLC which leads to more efficient installation and execution of the actual program on the underlying PLC system. Typically, the user interface 110, transform component 130, and the simulator component 150 run on a platform such as a personal computer. It is to be appreciated that other arrangements are possible. For example, the transform component 130 and the simulator component 150 could reside on the PLC itself.

In general, chart components 120 of the program are assembled into five basic types of model elements at 140 although other basic types can be employed if desired. The basic model element types 140 include linear segments, AND divergences, AND Convergences, OR divergences, and OR convergences. After transforming the chart components 120 into the basic types at 140, the basic types of the model are then executed via the simulator component 150. During execution, program validity can be checked and verified. If errors are detected, the program designer can be notified at the user interface 110 where the error occurred and what actions may be necessary to correct such errors. When the model has been generated at 140, structure of the model can then be tested at the simulator component 150 by analyzing a response to message events that are applied to the model. Such events include Activate, Deactivate, and Fire, for example, which are described in more detail below and where model elements can respond by raising an error, sending deactivate messages to other model elements, sending activate messages to other model elements, or sending fire messages to other model elements. As can be appreciated, other event messages and responses can be provided if desired.

In another aspect, a program verification component is provided for an industrial control system. This includes means for transforming sequential function chart components (transform component 130) into a simulation model (140) having a subset of components and means for executing the subset of components (simulation component 150) from the simulation model to facilitate verification of the sequential function chart components.

Figure 2:
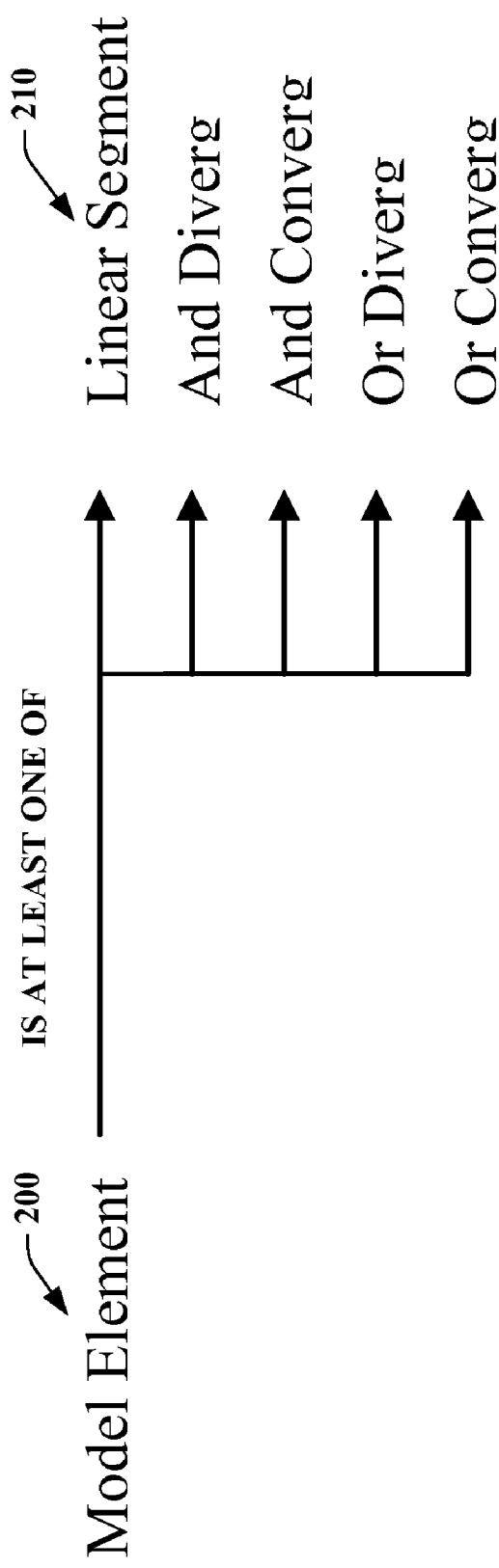
FIG. 2 is a diagram illustrating reduction of program charts into basic model element types.

FIG. 2 illustrates how Industrial control program charts are reduced to basic types of model elements 200. As shown, the model elements 200 can be reduced or processed into to five basic types as illustrated at 210. As noted above, the basic model element types 210 can include linear segments, AND divergences, AND Convergences, OR divergences, and/or OR convergences. The basic elements types 210 form a model of the SFC to be examined, where the model is then queried or stimulated to perform a program validity check. The model 210 is a simplified representation of the SFC that is constructed from a fully formed SFC diagram. The model is assembled from five types of model elements at 210 although more or less than five basic model types can be employed. In the transformation from SFC chart to basic model elements 210, divergences and convergences (AND and OR) are created by matching program objects in the underlying SFC program. Thus, components of the program are analyzed, identified, and assigned a basic model element type 210 which forms a basic program model for simulation as is described in more detail with respect to FIG. 3. Typically, other SFC element structures than AND/OR convergences or divergences are mapped into Linear Segments. An example of the generation of a simplified model is demonstrated in FIG. 3.

Figure 3:
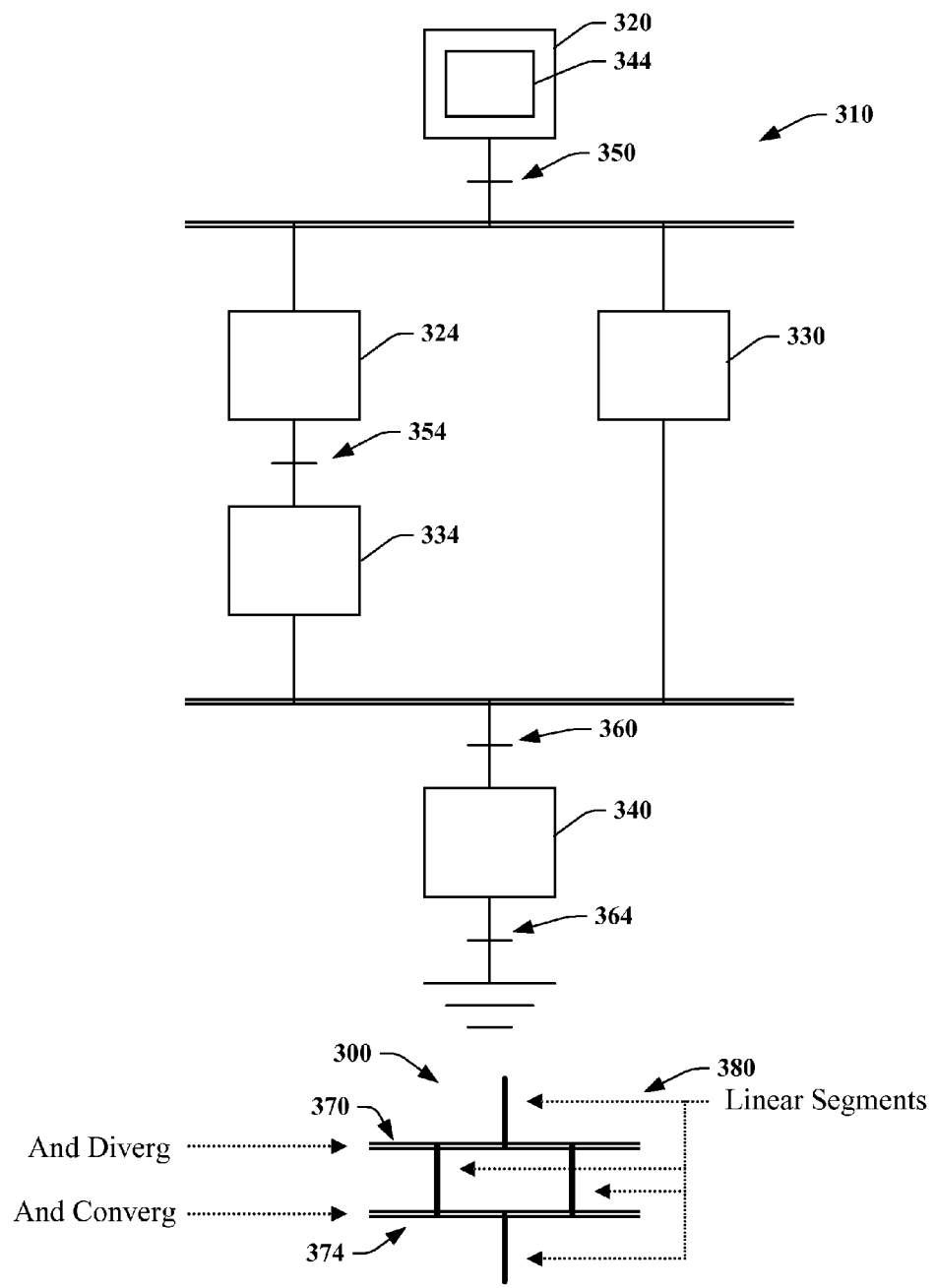
FIG. 3 is a diagram illustrating generation of a simplified model from an SFC program.

FIG. 3 illustrates generation of a simplified model 300 from an SFC program 310. The SFC program 310 is exemplary in nature and not intended to show all combinations of SFC's which can be extensive. Basic elements of the SFC 310 include program steps 320 through 340, where within any given step one or more actions may be programmed as illustrated by a block shown at 344 inside step 320. Several transitions may be programmed as shown at 350 through 364. As noted above, transitions enable continuation of the SFC program from one step or branch to another. Such transitions 350-364 can be keyed off of an input condition for example, where if the input is true, the transition can continue to the next chart element. After the basic chart 310 has been programmed, the transformation component described above with respect to FIG. 1 generates a simplified model as illustrated at 310. In this example, the chart of 310 is reduced to an AND divergence at 370 and an AND convergence at 374, were such divergences or convergences are joined by linear segments illustrated at 380. As can be appreciated, the simplified model 300 can change depending on the chart programmed at 310. Also, it is noted that transitions 350-364 do not appear in the simplified model 300.

Figure 4:
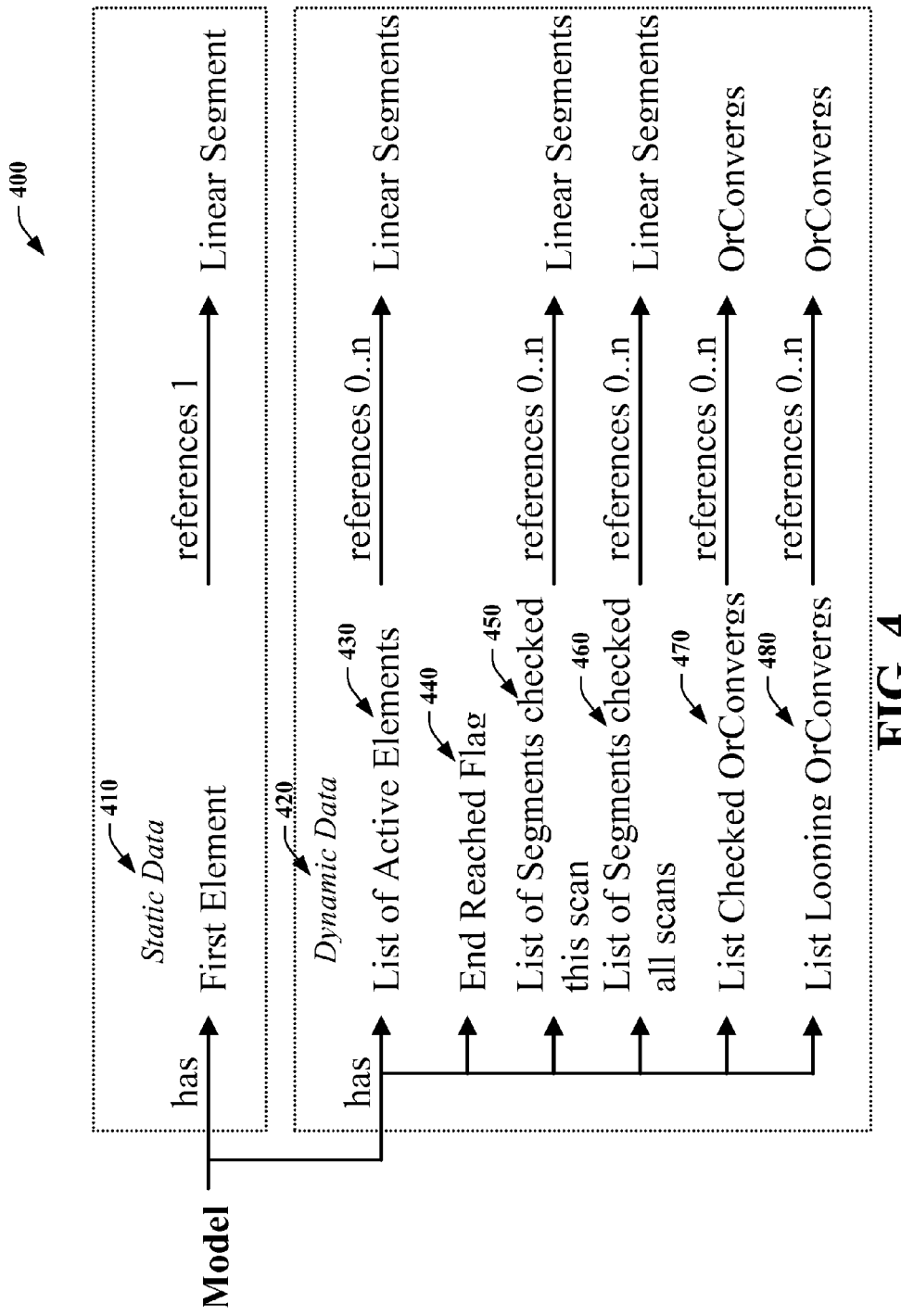
FIG. 4 is a diagram illustrating static and dynamic data that can be employed with a simplified model.
Figure 5:
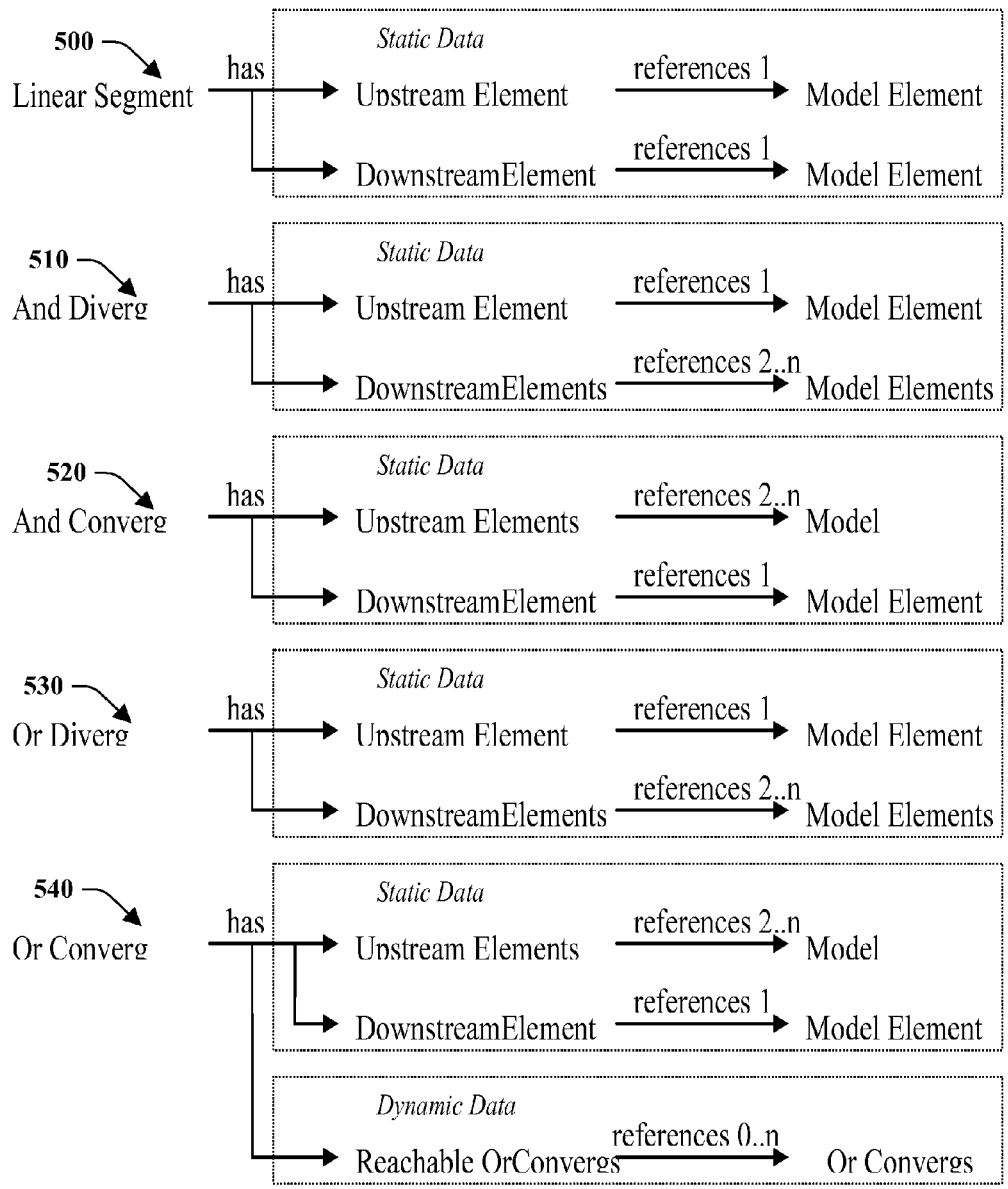
FIG. 5 is a diagram illustrating the bidirectional nature of model elements and references.

Referring now to FIG. 4, a diagram 400 illustrates static data 410 and dynamic data 420 that can be employed with the simplified model depicted in FIG. 3. In general, the simplified SFC model described above typically includes two types of data. The "static" data 410 in the model holds the simplified representation of the SFC from which it was created. The "dynamic" data 420 within the model is used during the SFC structure validation process. The diagram 400 depicts the static data 410 and dynamic data 420 held within the model. It is noted that the "static" portion of the model holds a single reference to the "first" linear segment in the model. This is due to fact that the rest of the model is held by references from other model elements. These references are bi-directional and are depicted in FIG. 5. As shown in the diagram 400, the model may include a first static element at 410 that references one other linear segment. The dynamic aspects 420 may include a list of active elements at 430, an end reached flag at 440, a list of segments checked for the current scan at 450, a list of all segments scanned at 460, a list of OR convergences checked 470, a list of looping OR convergences checked 480, and so forth. The list 430, 450, and 460 can include zero or more references to linear segments, where the lists 470 and 480 can include zero or more references to OR convergences.

Referring to FIG. 5, the bidirectional nature of references described in FIG. 4 is shown in more detail with respect to model elements. At 500, a linear segment has one upstream element and one downstream element, where the upstream and downstream elements reference one model element respectively. At 510, an AND divergence has an upstream element that references one model element and downstream elements that reference two or more model elements. At 520, an AND convergence has upstream elements that reference two or more model elements and one downstream element that references one model element. At 530, an OR divergence has an upstream element that references one model element and downstream elements that reference two or more model elements. At 540, an OR convergence has upstream elements that reference two or more model elements and one downstream element that references one model element. Also, the OR convergence 540 can be associated with dynamic data of reachable OR convergences that reference zero or more OR convergences. As can be appreciated, other model configurations are possible than the examples shown in FIG. 5.

Figure 6:
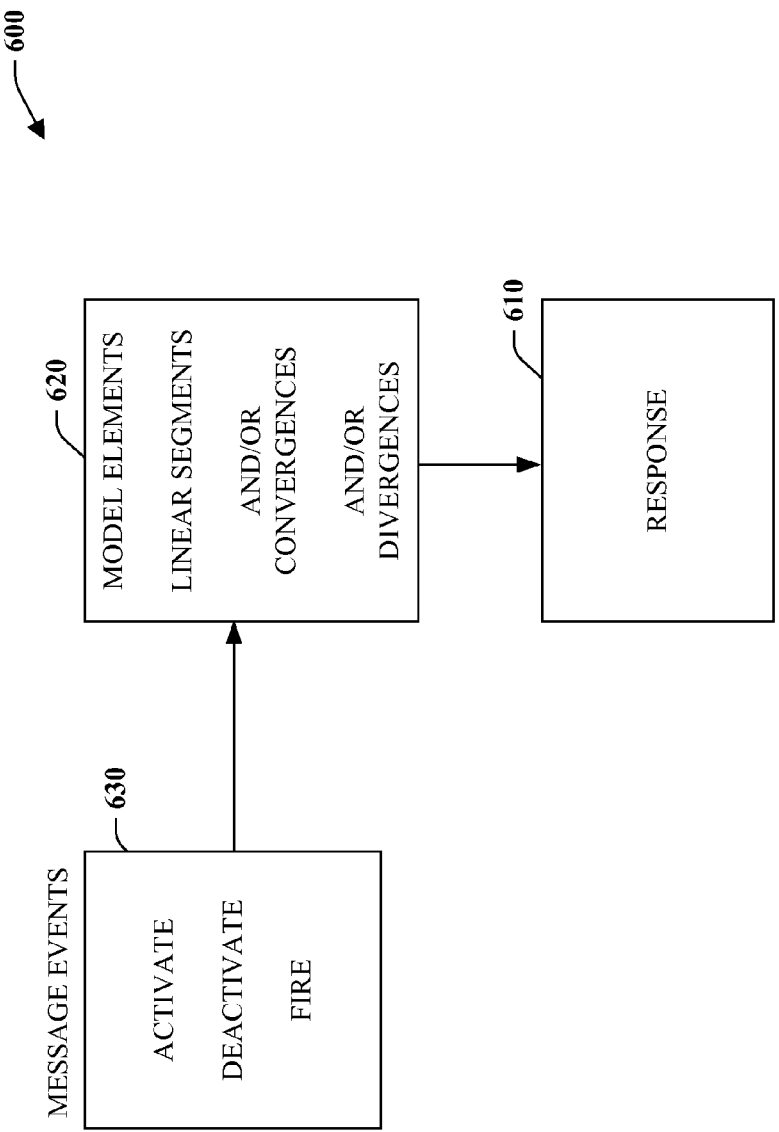
FIG. 6 is a diagram illustrating model structure validation via simulated execution of a model.

FIG. 6 illustrates a system 600 that provide model validation and simulation. When the model described above has been generated, the structure can be validated by simulated execution of the model. This can achieved via a response component 610 by which model elements 620 are monitored for a response to at least three possible message events 630 by which the elements can receive, where it is to be appreciated other events can also be generated. These message events 630 include Activate, Deactivate, and Fire event messages. Model elements 620 can respond at 610 to the message event by any/or all of the following types of actions including: 1. Raise an error; 2. Sending Deactivate Messages to other model elements; 3. Sending Activate Messages to other model elements; or 4. Sending Fire messages to other model elements. As can be appreciated, more than four actions can be provided.

The types of model elements 620 (e.g., linear segments, AND/OR convergence, AND/OR divergence) respond to message events as follows:

Linear Segment—Activate: "Linear Segment" model elements respond to an Activate message event by:

1. Adds itself to a list of model elements checked in this scan

2. Adds itself to a list of model elements checked in all scans

3. If not already present in list of active model elements
Add self to list of active model elements Else
Raise "Dual Activation" error Linear Segment—Deactivate: "Linear Segment" model elements respond to a Deactivate message event by:

1. Remove self from list of active model elements

Linear Segment—Fire: "Linear Segment" model elements respond to a Fire message event by:

If list of downstream elements is empty (final segment)
If active model elements count equals one
Mark all "Or Convergence" objects checked during this scan as having a path to the end of the model
Else
Raise "Terminal Step Parallelism" error Else if count of downstream elements equals 1
Send "Activate" message to downstream elements Else
Raise "Invalid Model" error And Divergence—Activate: "And Divergence" model elements respond to an Activate message event by:

1. Sends a "Fire" message to itself

And Divergence—Deactivate: "And Divergence" model elements respond to a Deactivate message event by:

1. No Action

Figure 7:
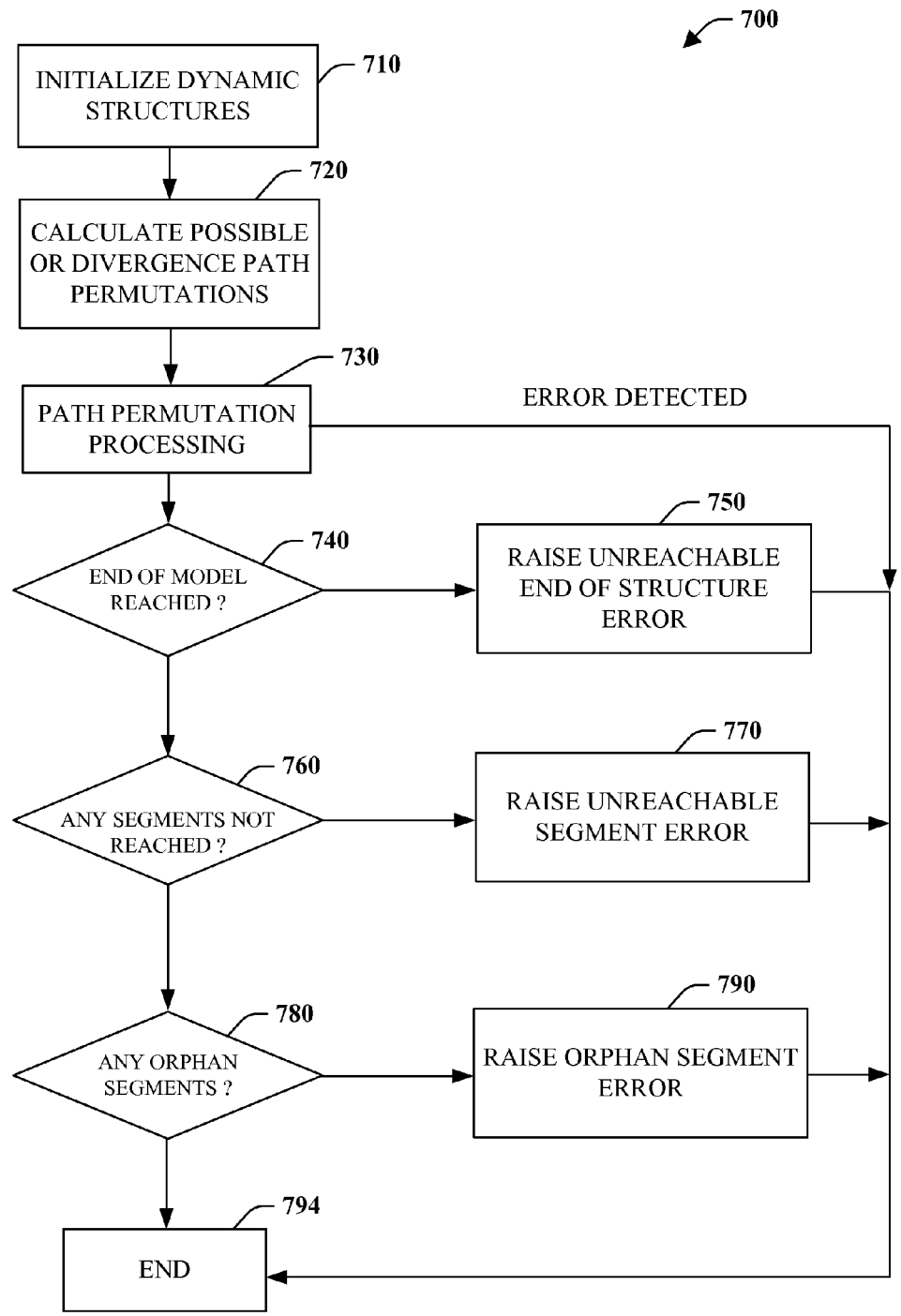
FIG. 7 is a flow diagram illustrating a model validation process.

And Divergence—Fire: "And Divergence" model elements respond to a Fire message event by:
1. Send a "Deactivate" message to the preceding Linear Segment element.
2. For each downstream element
Send an "Activate" message to the downstream element
3. For each downstream element that is in the model's Active Elements list
Send a "Fire" message to the active downstream element
And Convergence—Activate: "And Convergence" model elements respond to an Activate message event by:
1. If all preceding Linear Segment elements are in model's active list
Send "Fire" message to self
And Convergence—Deactivate: "And Convergence" model elements respond to a Deactivate message event by:
1. No Action
And Convergence—Fire: "And Convergence" model elements respond to a Fire message event by:
1. Send Deactivate messages to all preceding Linear Segments
2. Send Activate message to downstream Linear Segment
3. Send Fire message to downstream Linear Segment
Or Divergence—Activate: "Or Divergence" model elements respond to an Activate message event by:
1. Sends a "Fire" message to itself
Or Divergence—Deactivate: "Or Divergence" model elements respond to a Deactivate message event by:
1. No Action
Or Divergence—Fire: "Or Divergence" model elements respond to a Fire message event by:
1 Send a Deactivate message to the preceding Linear Segment element.
2. Lookup downstream Linear Segment branch to be used in this scan
3. Send Activate Message to Linear Segment branch to be used in this scan
4. Send Fire Message to Linear Segment branch used in this scan
Or Convergence—Activate: "Or Convergence" model elements respond to an Activate message event by:
1. Add self to list of "Or Convergences" checked this scan
2. Sends a Fire message to itself
Or Convergence—Deactivate: "Or Convergence" model elements respond to a Deactivate message event by:
1. No Action
Or Convergence—Fire: "Or Convergence" model elements respond to a Fire message event by:
1. Send a Deactivate message to the preceding Linear Segment element that was the source of the Activate message that triggered the "Or Convergence" to send a Fire message to itself.
2. For each "Or Convergence" in the model's list of Looping "Or Convergences", add this element to the "Or Convergence's list of reachable "Or Convergences".
3. If the downstream "Linear Segment" has been checked this scan (loop back) then
If this element is in the list of looping "Or Convergences" (second time through loop) then
Send an Activate message to the downstream Linear Segment
else
Add this element to the model's list of looping "Or Convergences"
Send an Activate message to the downstream linear segment Send a Fire message to the downstream linear segment
Remove this element from the model's list of looping "Or Convergences"
else
Send Activate message to downstream Linear Segment
Send Fire message to downstream Linear Segment FIG. 7 illustrates a model validation process 700 for an industrial automation system. While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Validation of the models described above can be initiated by the model when processing a Validation Request message as described with respect to FIG. 6. When the model receives a validation request message, it can execute the following sequence of actions. At 710, initialize dynamic structures in the model. This can include:
a. Empty List of Active Elements
b. Set End of Model Reached Flag FALSE
c. Empty List of Segments Checked this Scan
d. Empty List of Segments Checked all Scans
e. Empty List of Or Convergences Checked this scan
At 720, calculate possible Or Divergence path permutations, where at 730 (which executes once per permutation), for each Or Divergence path permutation found, perform the following processing:
a. For each Or Divergence in Model
i. Specify Downstream Segment to be used by Or Divergence
b. Send Activate message to first element in model
c. Send Fire message to first element in model
d. Reinitialize all "per-scan" Dynamic Structures
i. Empty List of Active Elements
ii. Empty List of Segments checked this scan
iii. Empty List Or Convergences Checked this scan
Proceeding to 740, a decision is made as to whether simulation of the simplified model reached its expected termination. If End of a Model Reached Flag is FALSE then raise "Unreachable End of Structure" error at 750, otherwise proceed to 760. At 760, if any Linear Segment not in List of Segments Checked all Scans then raise an "Unreachable Segment" error at 770, otherwise proceed to 780. At 780, if any Or Convergence not marked as having a path to the end or is in a loop with an Or Convergence marked as having a path to the end then raise an "Orphan Segment" Error at 790, otherwise proceed to end of validation at 794, where an operator can be notified that an SFC program is valid without errors if none of the error acts 750, 770, or 790 have been executed. The processing of the validation request message for the model can be halted upon the raising of an error by any message processing such as at 750, 770, or 790, where the operator can be notified of such errors and possible suggestions can be made to correct the errors. If the validation request message processing completes without the raising of an error at 794, then the SFC structure represented by the model is considered to be valid and the operator can be notified of such validity.

Figure 8:
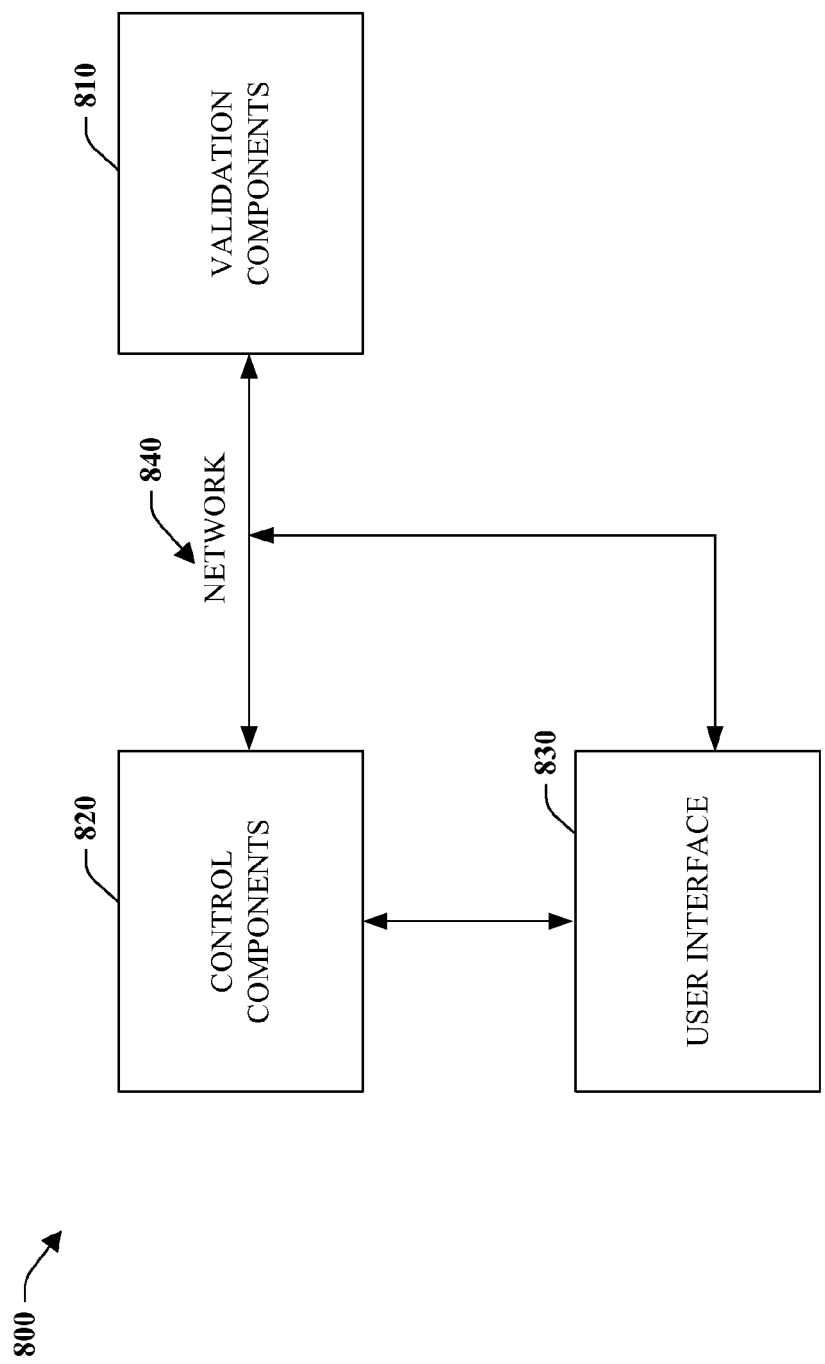
FIG. 8 illustrates an example system for an industrial control environment.

FIG. 8 illustrates an example system 800, network and user interface that can be employed with validation components 810. As shown, the validation components 810 can be employed with one or more control components 820 and user interface 830. The validation components 810, control components 820 and interface 830 can communicate across a network 840 with one or more remote applications. The control components 820 can include various computer or network components such as servers, clients, programmable logic controllers (PLCs), communications modules, mobile computers, wireless components, control components and so forth which are capable of interacting across the network 840. Similarly, the term PLC as used herein can include functionality that can be shared across multiple components, systems, and or networks 840. For example, one or more PLCs can communicate and cooperate with various network devices across the network 840. This can include substantially any type of control, communications module, computer, I/O device, sensor, Human Machine Interface (HMI)) such as the user interface 830 that communicate via the network 840 which includes control, automation, and/or public networks. The PLC can also communicate to and control various other devices such as Input/Output modules including Analog, Digital, Programmed/Intelligent I/O modules, other programmable controllers, communications modules, sensors, output devices, and the like.

The network 840 can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 9:
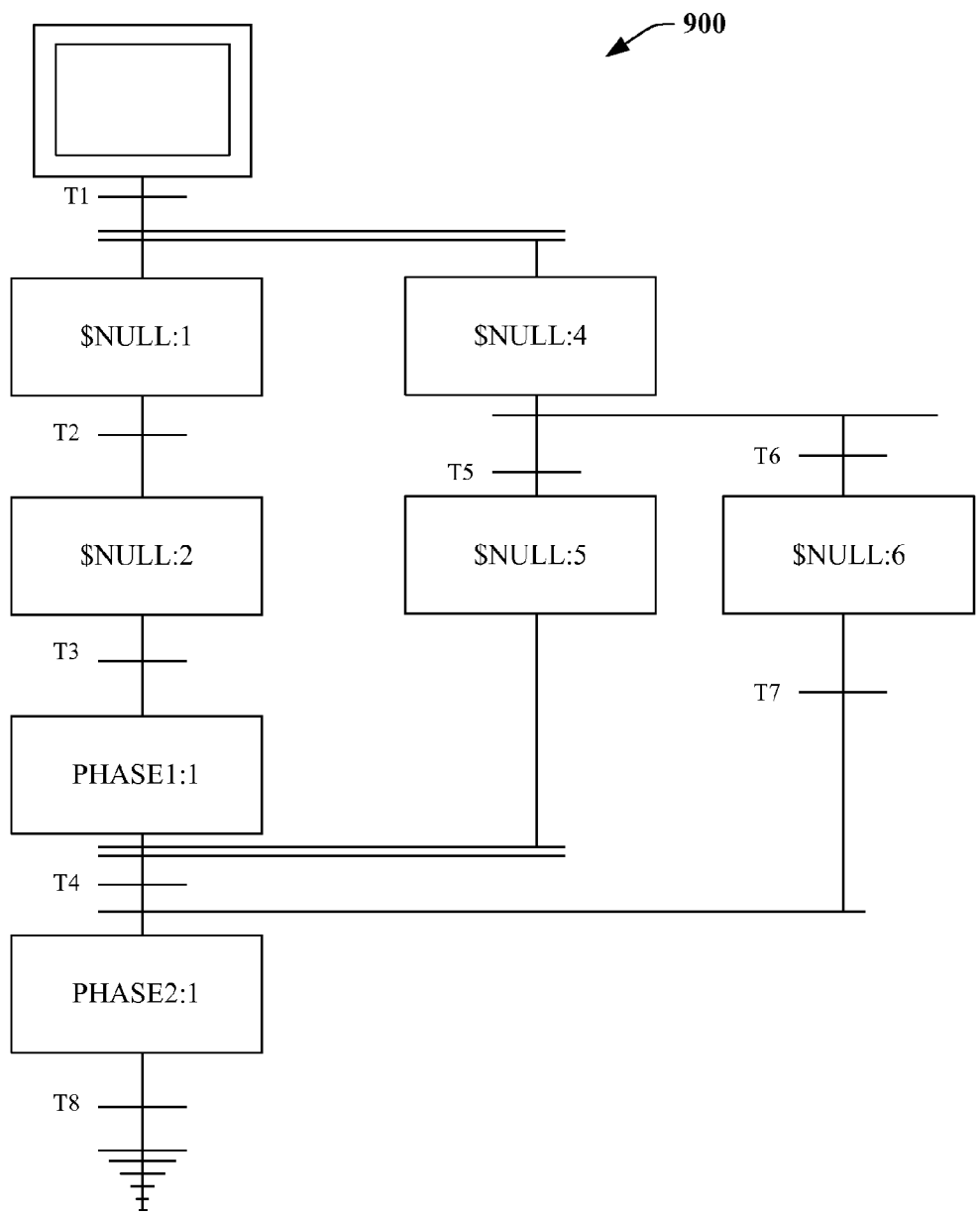
FIGS. 9-22 illustrate Sequential Function Chart (SFC) examples that depict valid and invalid SFC structures that can be detected via simulation tools and models.
Figure 10:
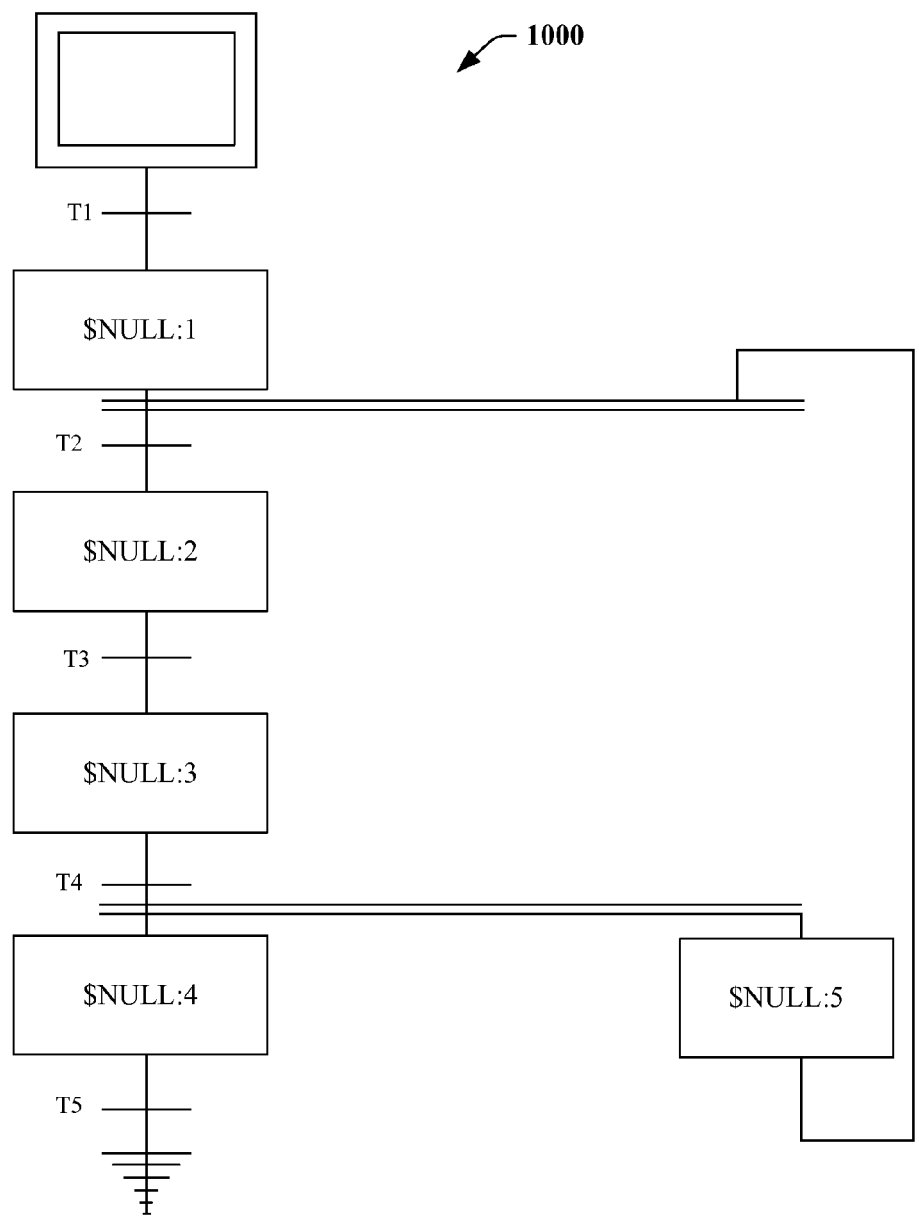

FIGS. 9-22 illustrate Sequential Function Chart (SFC) examples that depict valid and invalid SFC structures that can be detected via simulation tools and models. Proceeding to FIG. 9, an SFC 900 illustrates an illegal terminal step and parallelism error that can be detected by the validation components discussed above. At FIG. 10, an SFC 1000 depicts an invalid or illegal AND Loop Back condition that can be detected. As can be appreciated, messages can be generated for any detected error describing the particular error, identifying where the error was located in the chart, and offering automated solutions for correcting such errors.

Figure 11:
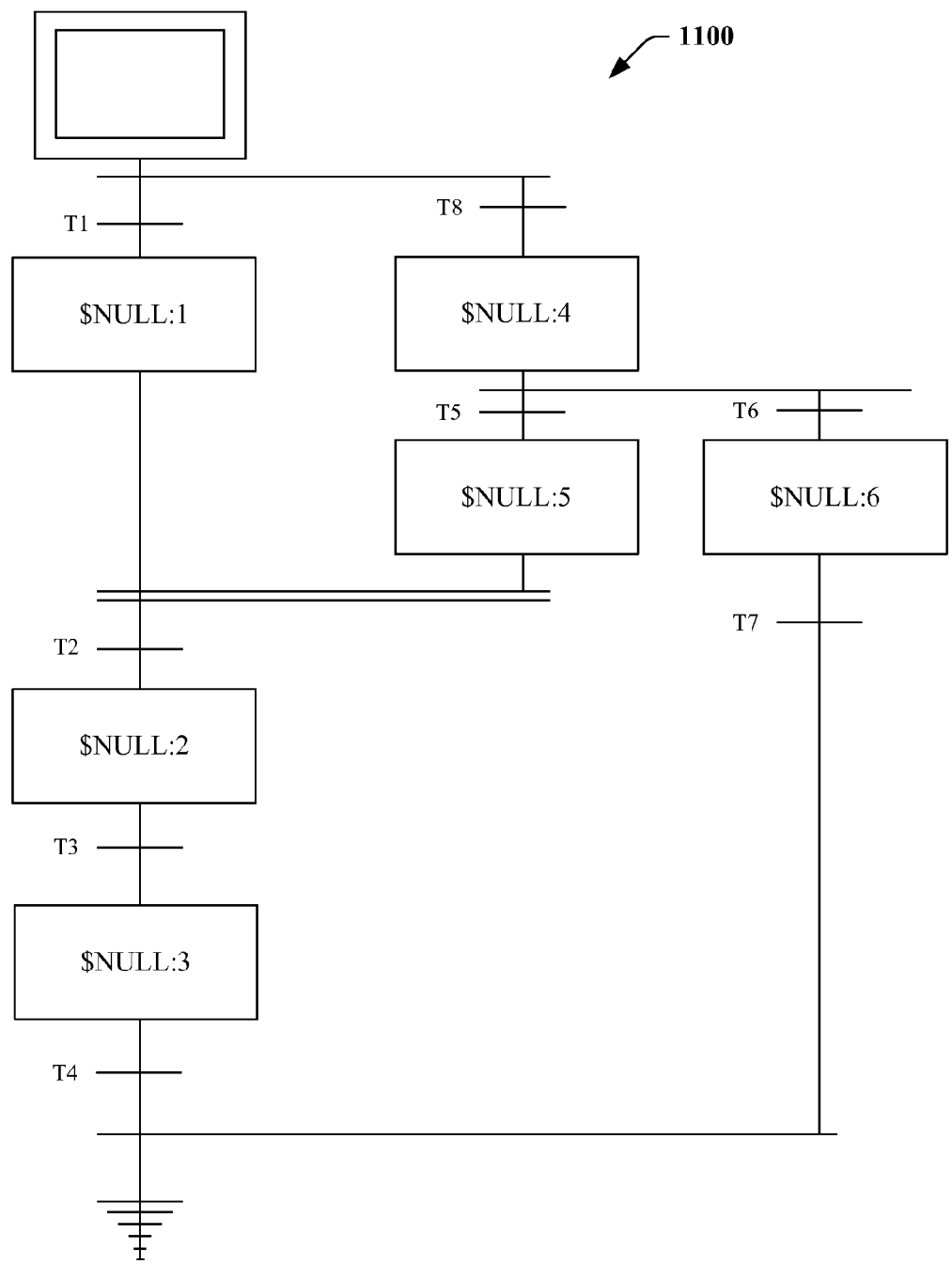
Figure 12:
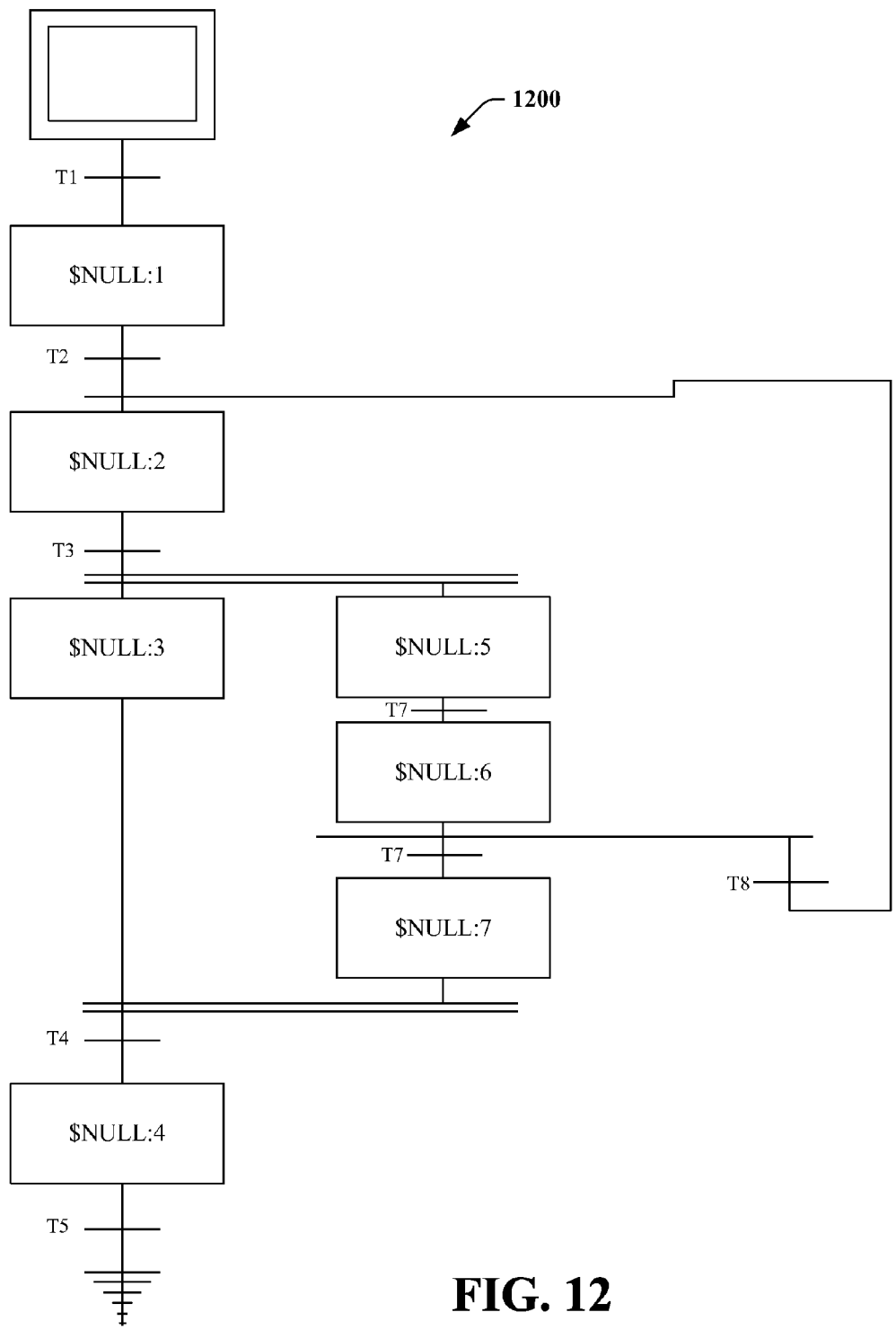
Figure 13:
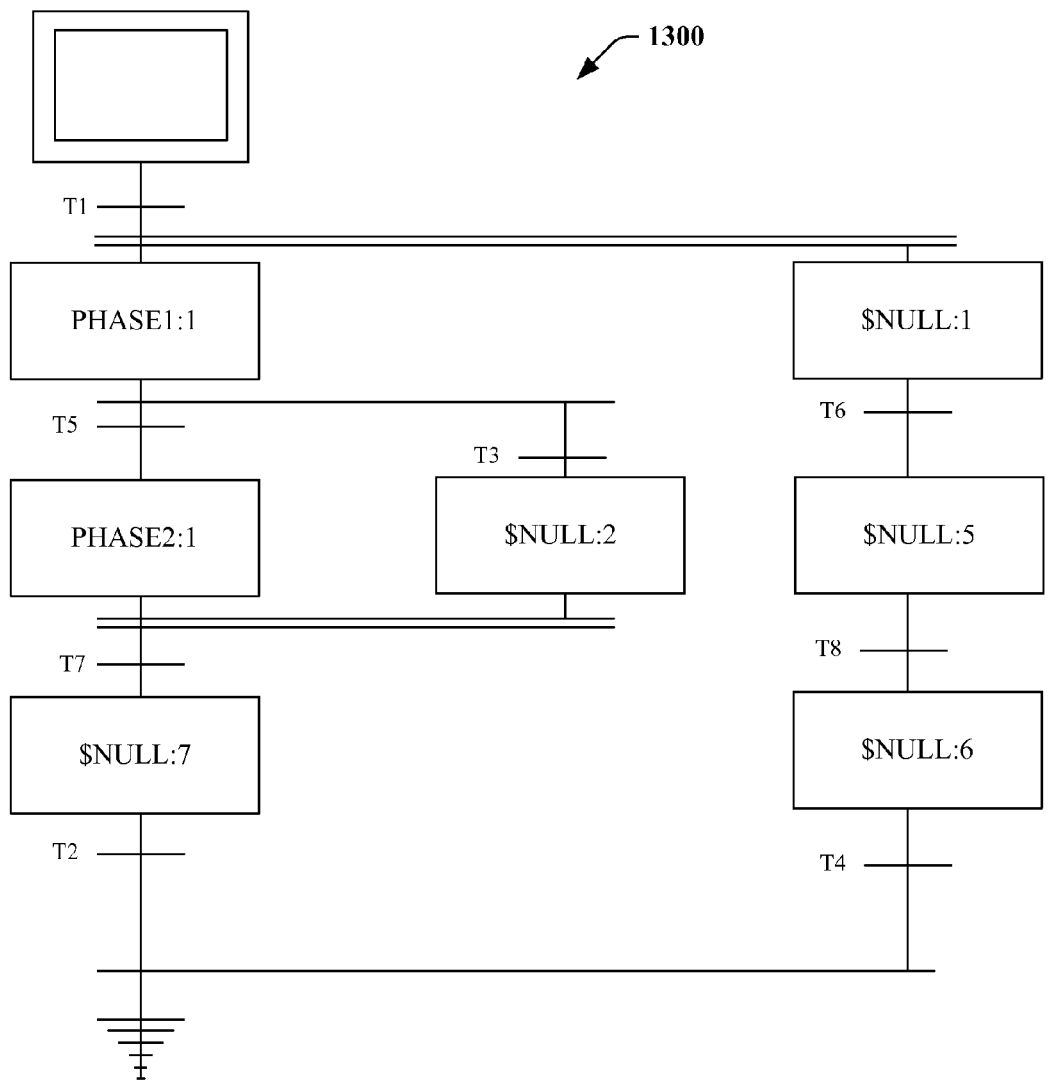
Figure 14:
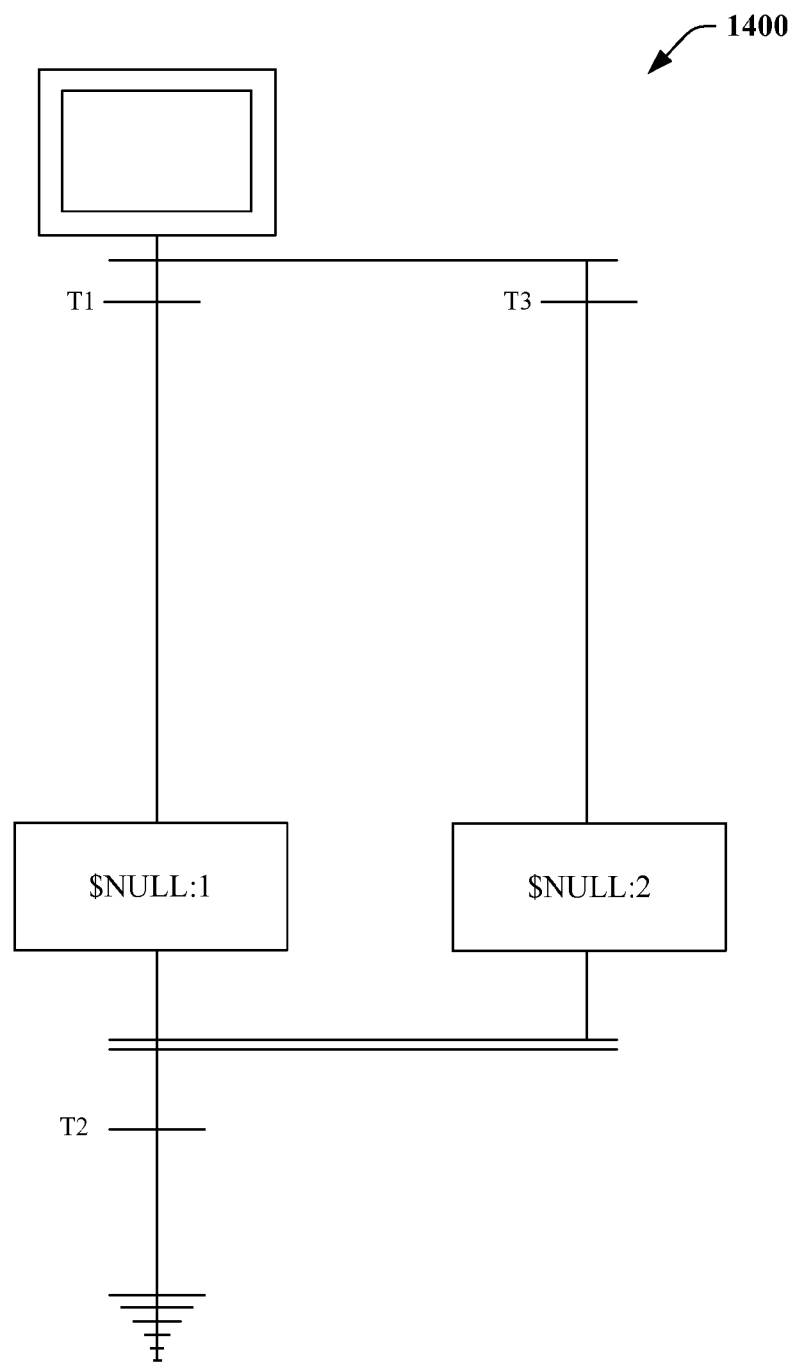
Figure 15:
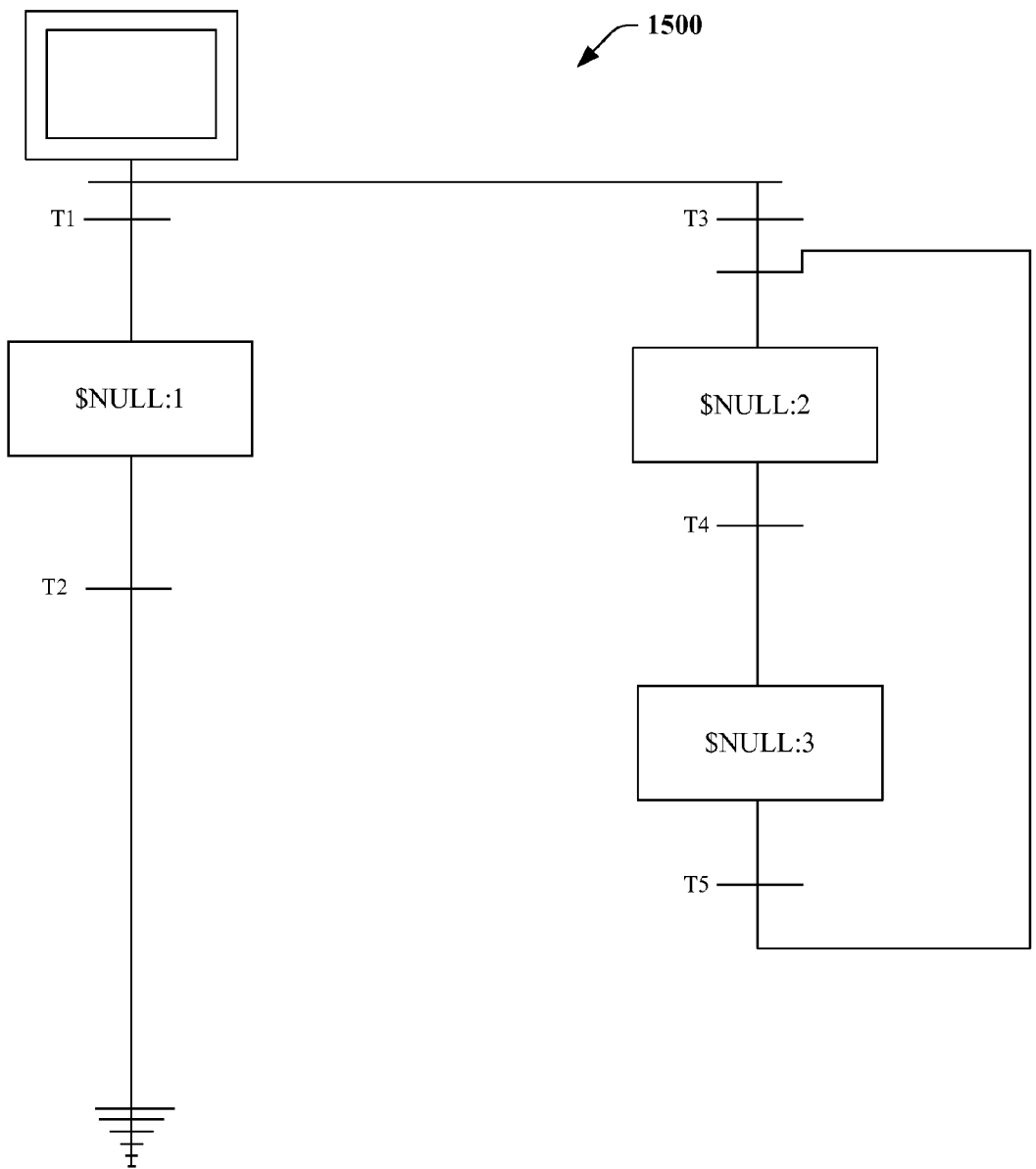
Figure 16:
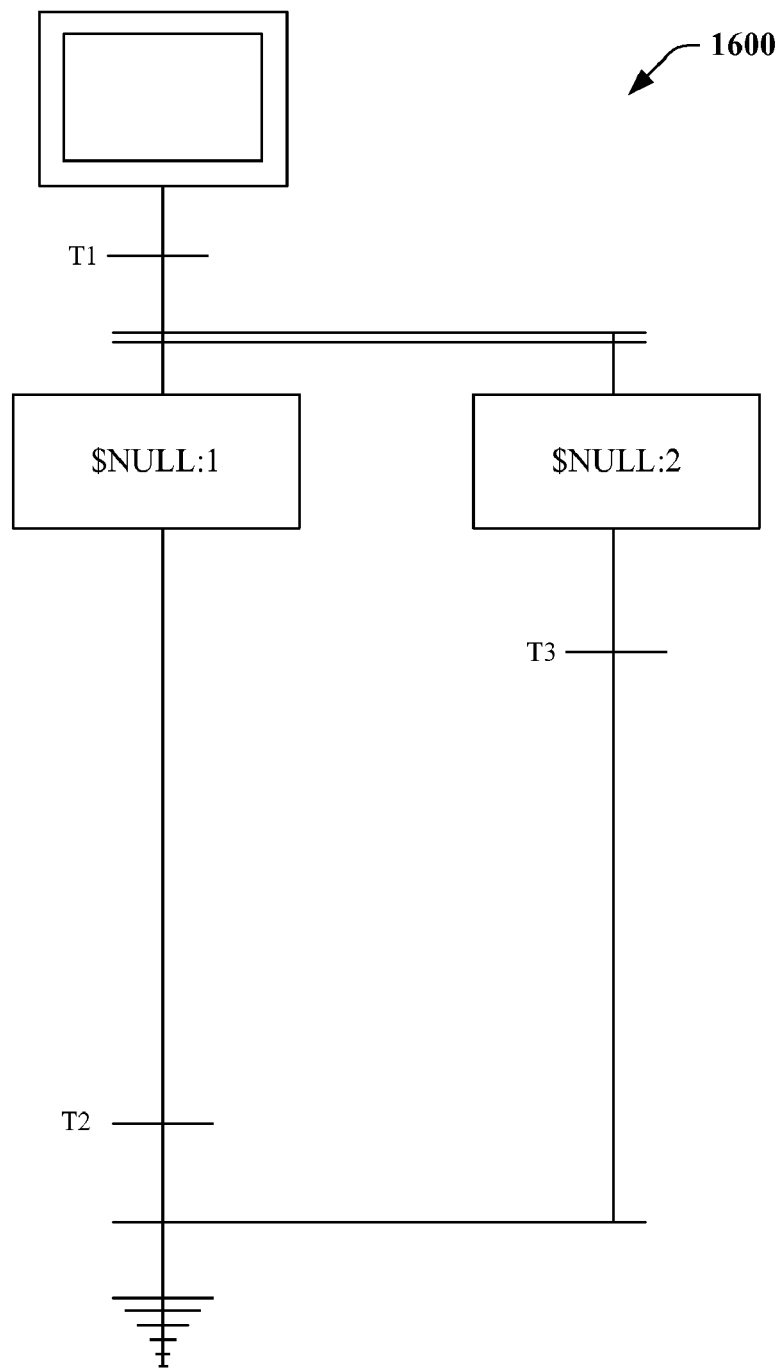
Figure 17:
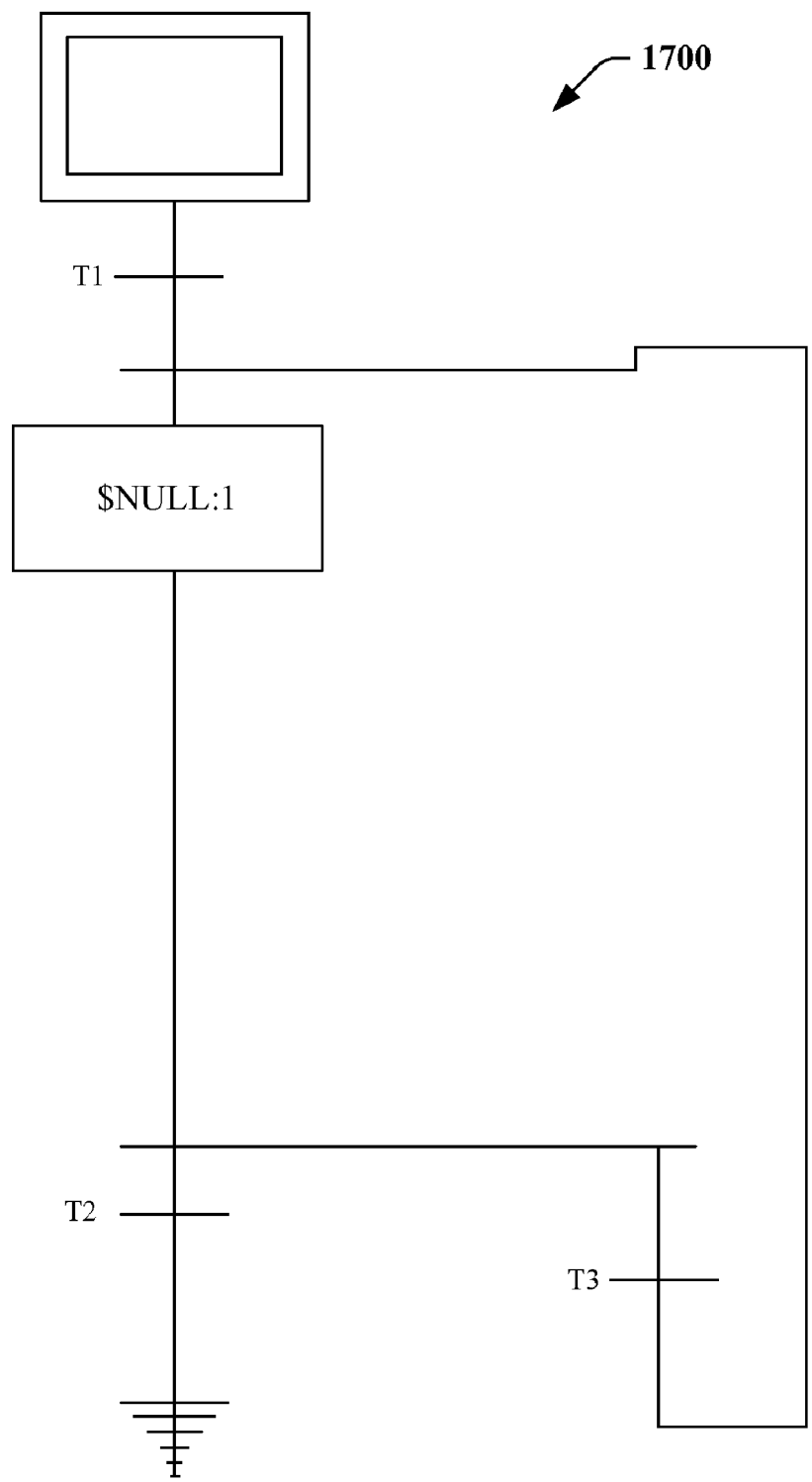
Figure 18:
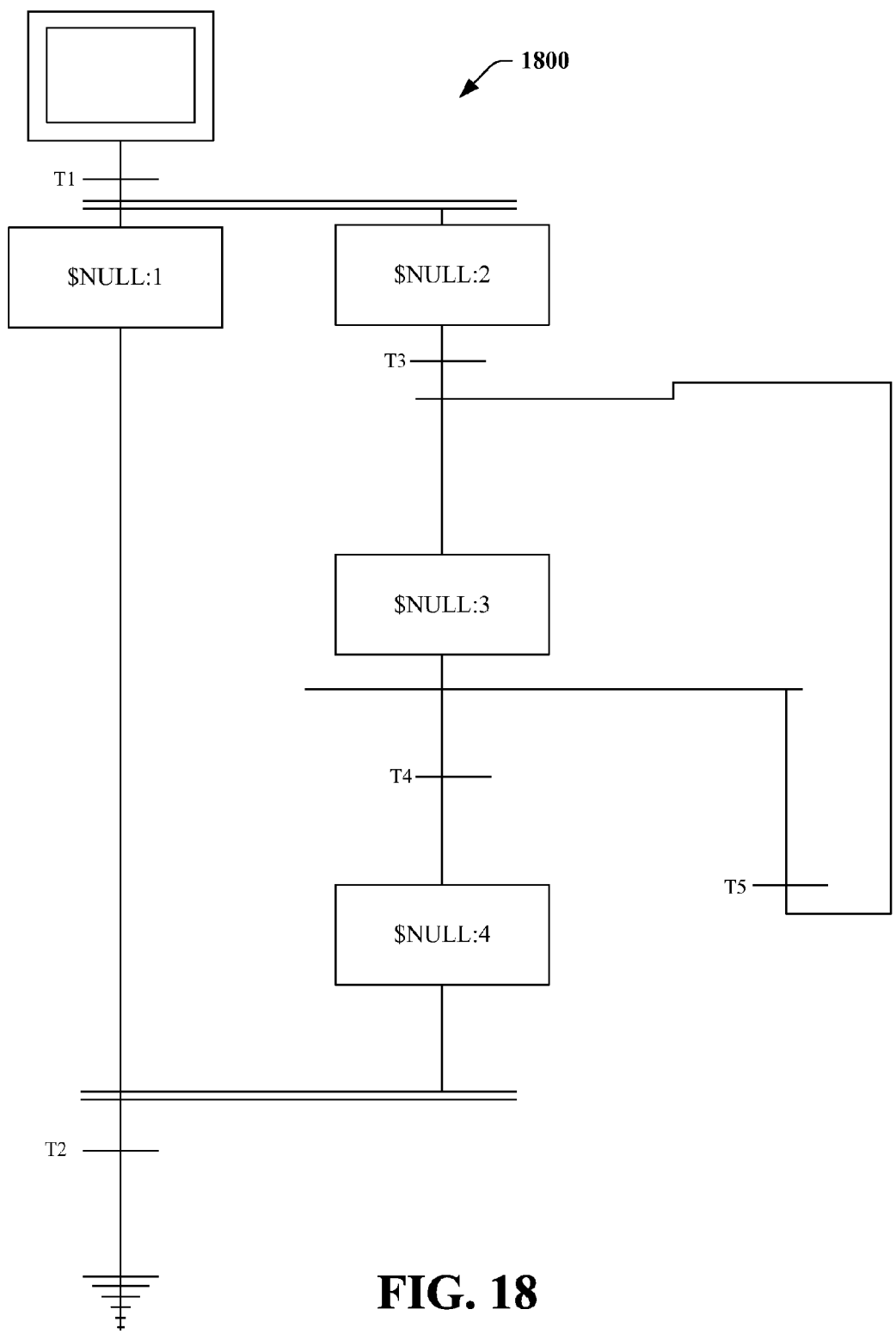
Figure 19:
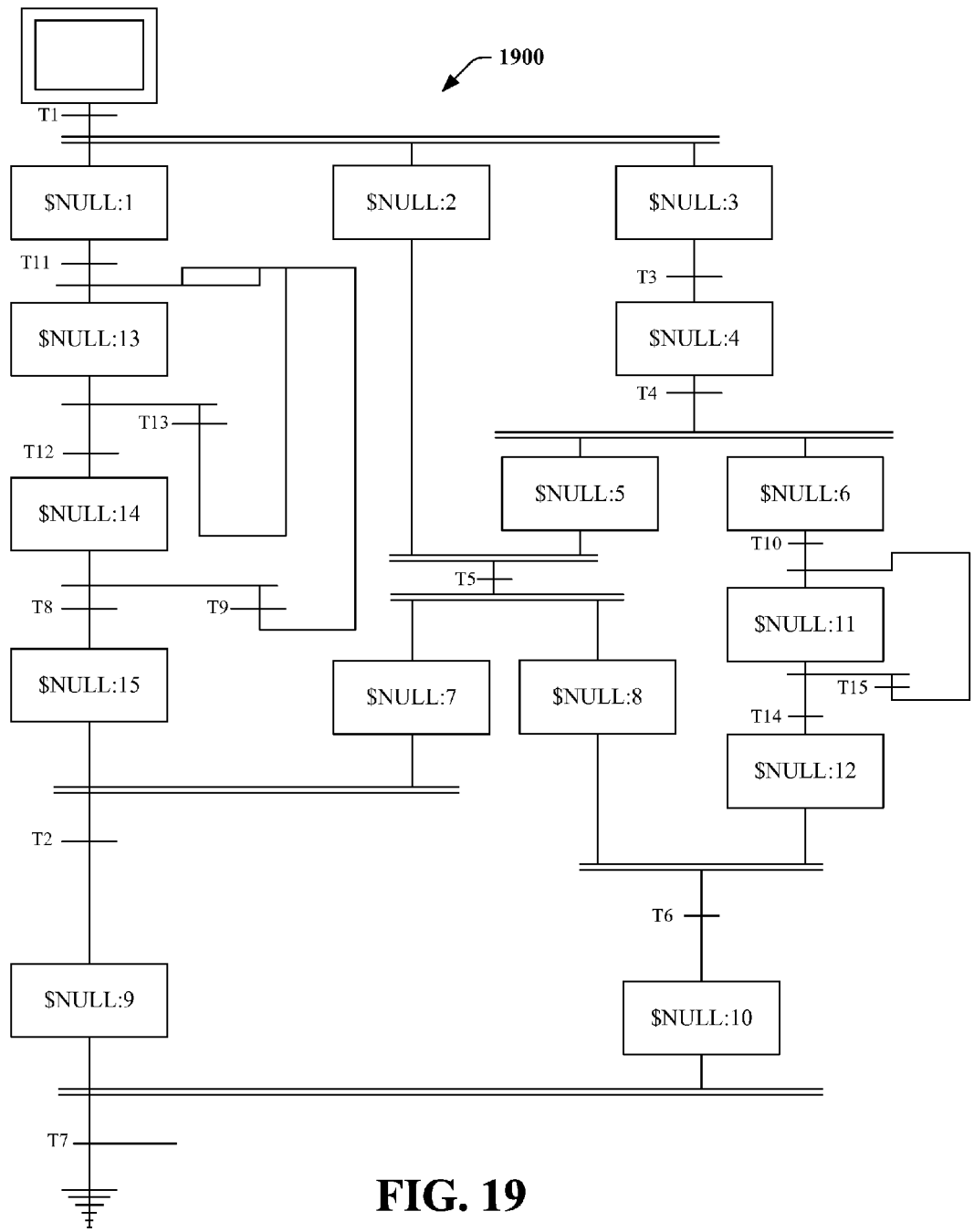
Figure 20:
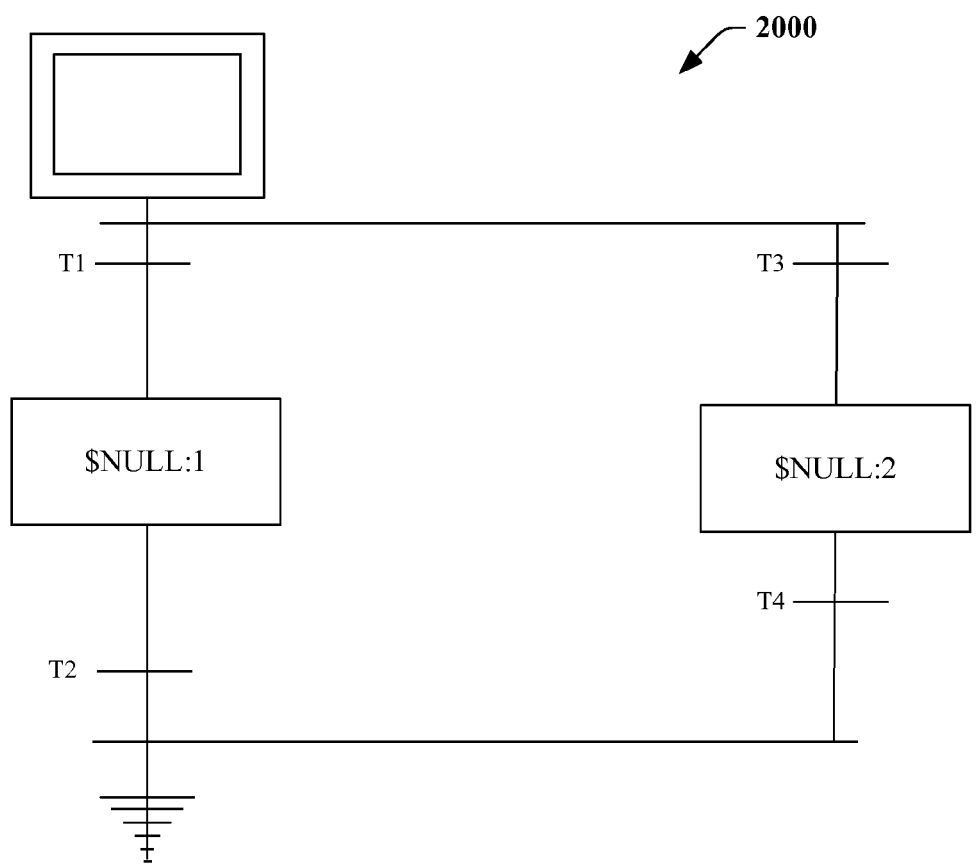
Figure 21:
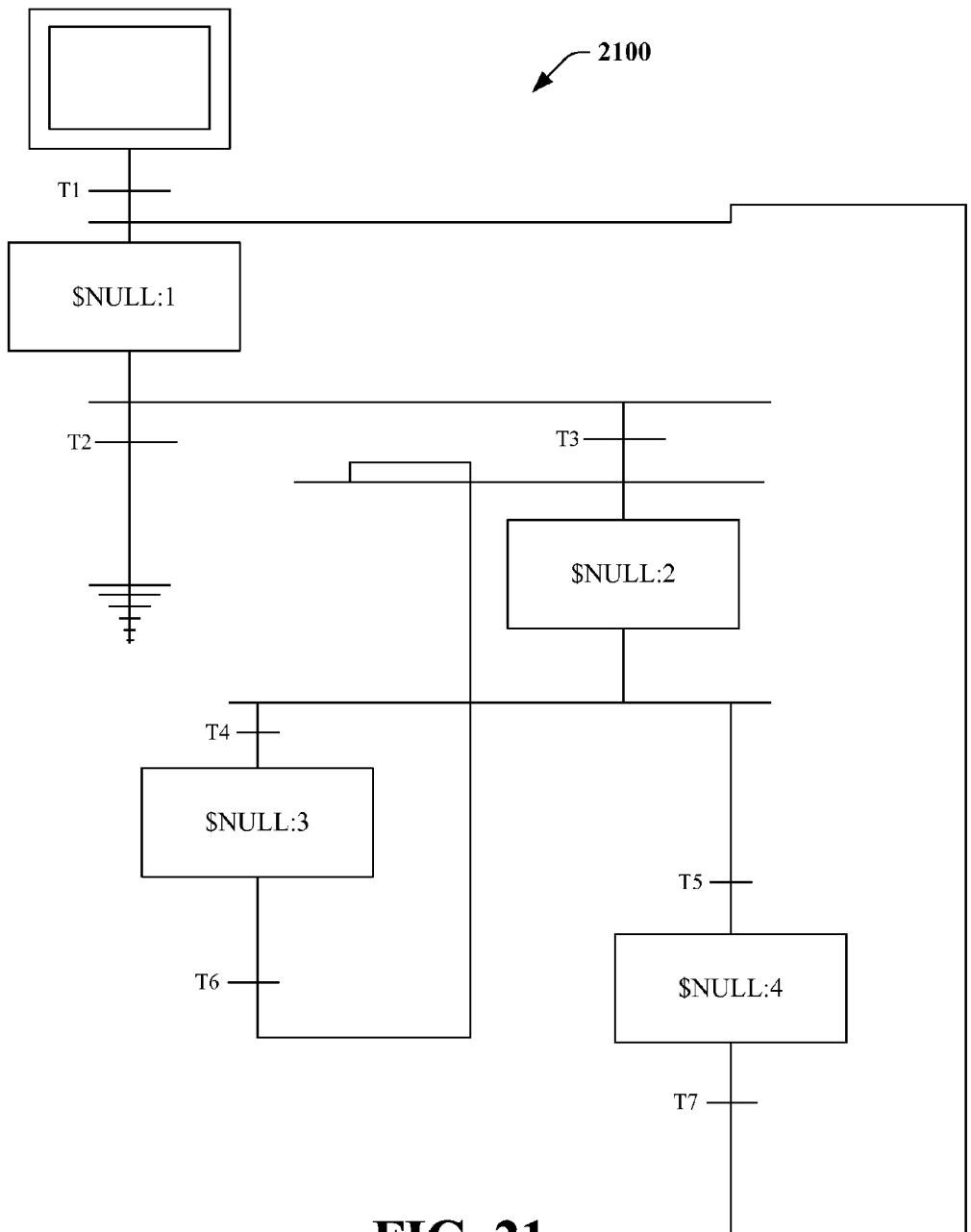
Figure 22:
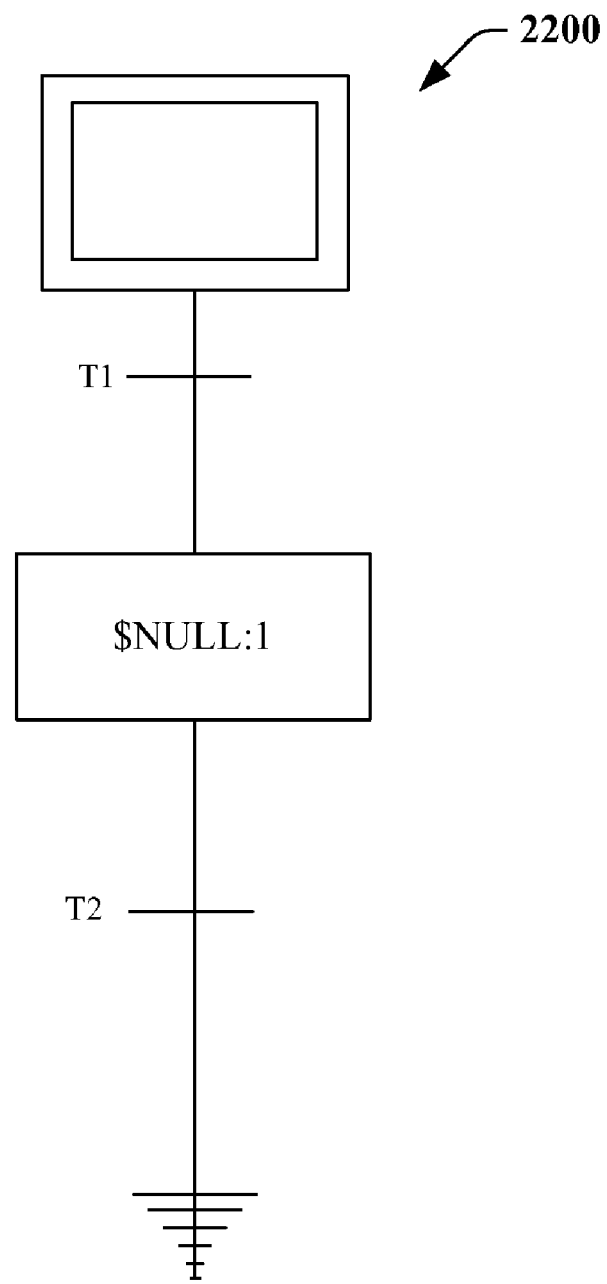

FIG. 11 illustrates an SFC 1100 that depicts an illegal Cannot Finish condition. FIG. 12 illustrates an SFC 1200 depicting an illegal Loop back condition. FIG. 13 illustrates an SFC 1300 that shows an illegal mismatched And/Or Divergence and Convergence conditions. Proceeding to FIG. 14, is an SFC 1400 that shows an illegal OR Divergence into an AND Convergence condition. FIG. 15 is an SFC 1500 that illustrates an illegal OR Divergence into an Infinite Loop condition. FIG. 16 is an SFC 1600 that depicts an illegal AND Divergence into an OR Convergence condition. FIG. 17 is an SFC 1700 that shows a valid or legal simple loop construction for an SFC. FIG. 18 is an SFC 1800 that represents a legal AND Divergence/Convergence with an Embedded Loop. FIG. 19 is an SFC 1900 that depicts legal Mismatched AND conditions. Also, the SFC 1900 shows a legal AND condition having an embedded loop. FIG. 20 is an SFC 2000 that illustrates a legal OR Divergence/Convergence condition. FIG. 21 is an SFC 2100 that depicts legal OR Loops. FIG. 22 is an SFC 2200 that represents a legal or valid simplified structure.

It is noted that the above validation components and tools can be processed on various types of computing devices and resources, where some of these devices may be associated with an industrial control component and other devices associated with standalone or networked computing devices. Thus, computers can be provided to execute the above components or associated data that include a processing unit, a system memory, and a system bus, for example. The system bus couples system components including, but not limited to, the system memory to the processing unit that can be any of various available processors. Dual microprocessors and other multiprocessor architectures also can be employed as the processing unit. Computers can operate in a networked environment using logical connections to one or more remote computers, such as remote computer(s). The remote computer(s) can be a personal computer, a server, a router, a network PC, a workstation, a microprocessor based appliance, a peer device or other common network node and the like, and typically includes many or all of the elements described relative to computer. Remote computers can be logically connected through a network interface and then physically connected via communication connection.

The systems described above employing the context data can include one or more client(s). The client(s) can be hardware and/or software (e.g., threads, processes, computing/control devices). The systems can also include one or more server(s). The server(s) can also be hardware and/or software (e.g., threads, processes, computing/control devices). The servers can house threads to perform transformations by employing the authentication protocol, for example. One possible communication between a client and a server may be in the form of a data packet adapted to be transmitted between two or more computer processes.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A simulation tool for an industrial automation system, comprising:
    at least one processor;
    at least one memory communicatively coupled to the at least one processor, the memory having stored therein processor executable instructions configured to implement the simulation tool including;
    a transform component that receives one or more program chart components as input and outputs a subset of model components for simulation, wherein the transform component automatically associates objects in a sequential function chart (SFC) with simplified structures in a model, wherein the model holds static data representative of the SFC, wherein the static data references at least one linear segment; and
    a simulation component that executes the subset of model components in order to validate the program chart components.

2. The system of claim 1, the transform component or the simulation component is executable on a computer.

3. The system of claim 1, the transform component or the simulation component is executable on a programmable logic controller.

4. The system of claim 1, the subset of model components include at least one of a linear segment, an AND Divergence, an AND Convergence, an OR Divergence, or an OR Convergence.

5. The system of claim 1, further comprising a user interface to develop the program chart components or receive feedback from the simulation component.

6. The system of claim 5, the feedback is associated with a validation message, an error message, an error location, or a troubleshooting suggestion.

7. The system of claim 1, the program chart components are associated with a Sequential Function Chart (SFC) or a Gant Chart.

8. The system of claim 1, the model also holds dynamic data representative of the SFC.

9. The system of claim 8, the dynamic data references a list of active elements, an end reached flag, a list of segments checked this scan, a list of segments checked all scans, a list of checked OR convergences, or a list of looping OR convergences.

10. The system of claim 9, the list of active elements references zero or more linear segments, the list of segments checked this scan references zero or more linear segments, the list of segments checked all scans references zero or more linear segments, the list of checked OR convergences references zero or more OR convergences, and the list of looping OR convergences references zero or more OR convergences.

11. The system of claim 8, the dynamic data references reachable OR convergences.

12. The system of claim 1, the model includes at least one upstream element and at least one downstream element.

13. The system of claim 1, further comprising one or more event messages that applied to the model in order to simulate execution of the model.

14. The system of claim 13, the event messages include at least one of an Activate message, a Deactivate message, or a Fire message.

15. The system of claim 13, further comprising a response component to monitor the event messages.

16. The system of claim 15, the response component at least one of raises an error, sends Deactivate messages to other model elements, sends Activate messages to other model elements, or sends Fire messages to other model components.

17. The system of claim 16, the error includes at least one of an unreachable end of structure error, an unreachable segment error, a terminal step parallelism error, or an orphan segment error.

18. The system of claim 16, the error includes at least one of an invalid terminal step condition, an invalid loop back condition, an invalid infinite loop condition, an invalid OR condition, or an invalid AND condition.

19. The system of claim 17, further comprising a component to determine a list of reachable or unreachable conditions.

20. A computer readable medium having computer executable instructions stored thereon to facilitate program validation in an industrial automation environment, comprising:

generating a program chart for an industrial control system;
reducing the program chart to a simplified model, wherein the simplified model includes at least one of a linear segment, an AND Divergence, an AND Convergence, an OR Divergence, or an OR Convergence; and
executing the simplified model via one or more event messages.

21. The computer readable medium of claim 20, the event messages include at least one of an activate message, a deactivate message, or a fire message.

22. The computer readable medium of claim 20, further comprising generating feedback in response to the event messages to facilitate troubleshooting of the program chart.

23. The medium of claim 20, further comprising instructions to generate a user interface to develop the program chart components.

24. The medium of claim 23, further comprising instructions to receive feedback from the validation component associated with a validation message, an error message, an error location, or a troubleshooting suggestion, via the user interface.

25. The medium of claim 20, wherein the generating the program chart comprises generating one of a Sequential Function Chart (SFC) or a Gant chart.

26. The medium of claim 20, wherein the generating the program chart comprises generating a Sequential Function Chart (SFC), and wherein reducing the program chart includes reducing the program chart to the simplified model, the simplified model holds static data and dynamic data representative of the SFC.

27. A method to validate an industrial control program, comprising:

generating a controller chart structure;
transforming the controller chart structure to a simplified model structure, the simplified model structure comprising at least one static structure and a plurality of dynamic structures, wherein the at least one static structure includes a reference to at least one linear segment;
simulating the simplified model structure to validate or invalidate the controller chart structure; and
initializing at least one of the plurality of dynamic structures.

28. The method of claim 27, further comprising generating one or more events to simulate the simplified model structure.

29. The method of claim 27, the controller chart structure is either a Sequential Function Chart (SFC) or a Gant Chart.

30. The method of claim 27, further comprising executing the simplified model structure on a computer or a programmable logic controller (PLC).

31. The method of claim 27, further comprising calculating one or more path permutations.

32. The method of claim 31, further comprising generating one or more error messages during processing of the path permutations.

33. The method of claim 32, the error messages are associated with an unreachable end of structure error, an unreachable segment error, or an orphan segment error.

* * * * *